(12) United States Patent
Hubbard

(10) Patent No.: US 11,492,230 B2
(45) Date of Patent: Nov. 8, 2022

(54) SHEAVE LINER INCLUDING WEAR INDICATORS

(71) Applicant: OTIS ELEVATOR COMPANY, Farmington, CT (US)

(72) Inventor: James L. Hubbard, Kensington, CT (US)

(73) Assignee: OTIS ELEVATOR COMPANY, Farmington, CT (US)

(*) Notice: Subject to any disclaimer, the term of this patent is extended or adjusted under 35 U.S.C. 154(b) by 1116 days.

(21) Appl. No.: 16/105,040

(22) Filed: Aug. 20, 2018

(65) Prior Publication Data
US 2020/0055696 A1 Feb. 20, 2020

(51) Int. Cl.
B66B 5/00 (2006.01)
B66B 15/04 (2006.01)
G01B 5/06 (2006.01)

(52) U.S. Cl.
CPC ............ *B66B 5/0025* (2013.01); *B66B 15/04* (2013.01); *G01B 5/06* (2013.01)

(58) Field of Classification Search
CPC ..... B66B 5/0025; B66B 15/04; B66B 11/008; B66B 5/0037; G01B 5/06; F16H 55/50; F16H 57/01; F16H 2057/014; B60C 11/24; B60C 11/246; Y10T 152/10027
See application file for complete search history.

(56) References Cited

U.S. PATENT DOCUMENTS

| 2,017,149 A | 10/1935 | Greening |
| 3,929,179 A | 12/1975 | Hines |
| 5,348,515 A | 9/1994 | Miller |
| 5,792,294 A * | 8/1998 | Randazzo ............... B29C 73/04 254/390 |
| 6,401,871 B2 | 6/2002 | Baranda et al. |
| 6,653,943 B2 | 11/2003 | Lamb et al. |
| 8,069,955 B2 | 12/2011 | Aulanko et al. |
| 8,317,160 B2 | 11/2012 | Romo et al. |
| 2009/0039326 A1 | 2/2009 | Triolier et al. |

(Continued)

FOREIGN PATENT DOCUMENTS

| CN | 202948650 U | 5/2013 |
| CN | 205244213 U | 5/2016 |

(Continued)

OTHER PUBLICATIONS

Office Action for Chinese Patent Application No. 201910768101.6 dated Sep. 3, 2020.

(Continued)

*Primary Examiner* — Jeffrey Donels
(74) *Attorney, Agent, or Firm* — Carlson, Gaskey & Olds, P.C.

(57) ABSTRACT

An illustrative example embodiment of an elevator sheave liner includes a liner body having a first surface configured to engage an elevator load bearing member and an oppositely facing second surface. The liner body includes a plurality of blind holes in the second surface including at least a first blind hole and a second blind hole. The first blind hole has a first depth and the second blind hole has a second, different depth. A material of the liner body has a first thickness between the first blind hole and the first surface and a second, different thickness between the second blind hole and the first surface.

19 Claims, 3 Drawing Sheets

(56) References Cited

U.S. PATENT DOCUMENTS

2011/0318497 A1    12/2011  Beals et al.
2015/0300959 A1    10/2015  Smith et al.
2020/0055707 A1*    2/2020  Hubbard ................. B66B 15/04

FOREIGN PATENT DOCUMENTS

| CN | 207986431 U   | 10/2018 |
| EP |   0312256 A1  |  4/1989 |
| EP |   2284111 A2  |  2/2011 |
| EP |   2497741 B1  |  4/2014 |
| EP |   2767498 A1  |  8/2014 |
| JP |  H1076814 A   |  3/1998 |
| JP | 2010159094 A  |  7/2010 |
| JP |   5195437 B2  |  5/2013 |
| WO |  02/100629 A1 | 12/2002 |
| WO | 2005/014311 A1 |  2/2005 |
| WO | 2012/162853 A1 | 12/2012 |
| WO | 2014065183    |  5/2014 |
| WO | 2019/092756 A1 |  5/2019 |

OTHER PUBLICATIONS

The Extended European Search Report for EP Application No. 19192699.7, dated Jan. 27, 2020.

\* cited by examiner

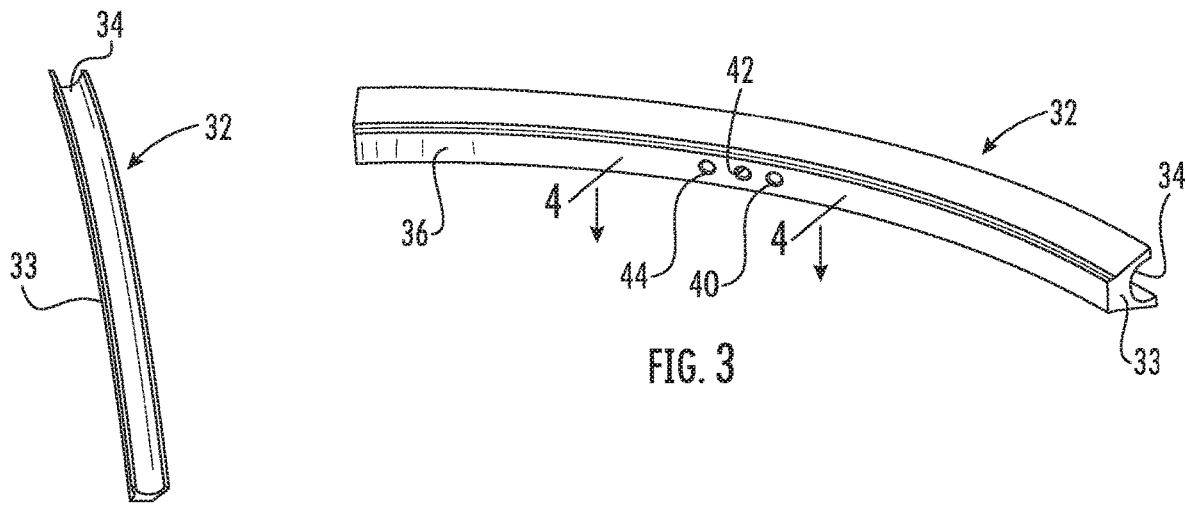
FIG. 2
FIG. 3
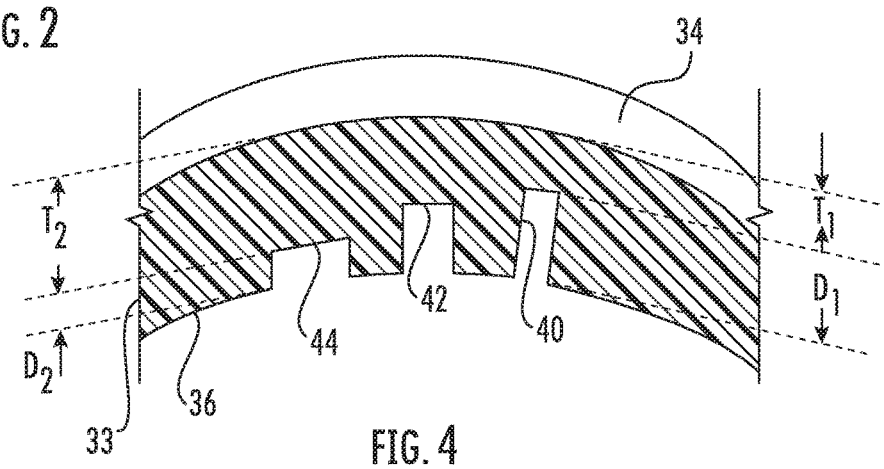
FIG. 4
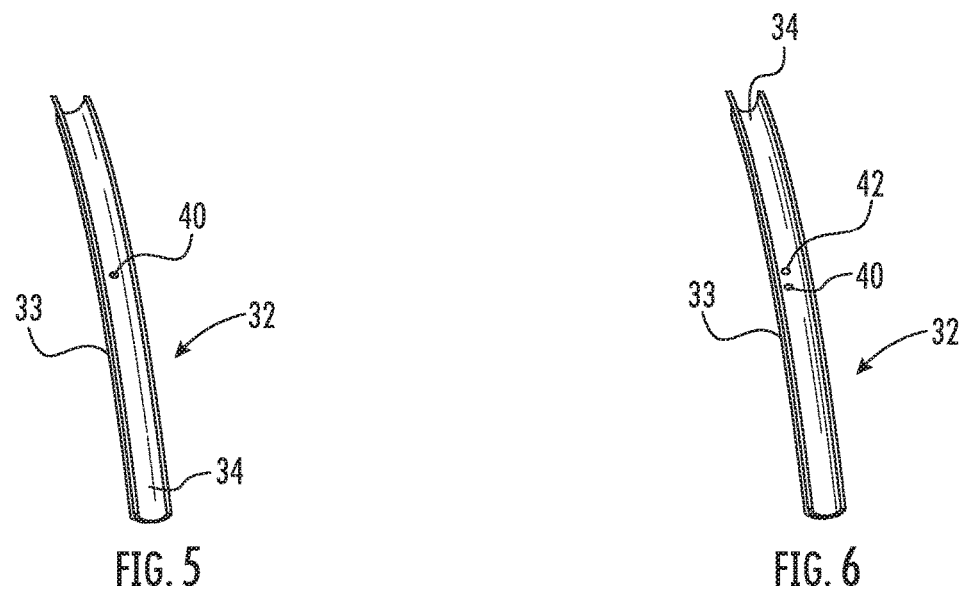
FIG. 5
FIG. 6

US 11,492,230 B2

SHEAVE LINER INCLUDING WEAR INDICATORS

BACKGROUND

Elevator systems may be traction-based and rely upon traction between roping and a traction sheave to achieve control over movement of the elevator car. Traditional roping arrangements include round steel ropes. More recently elevator systems have included flat belts instead of round steel ropes.

Different techniques have been developed for achieving the desired amount of traction between the ropes (or belts) and the traction sheave. One approach includes sheave liners on the traction sheave. One function of the sheave liners is to prevent or reduce wear of the ropes. While such liners have proven effective, one challenge associated with them is determining when the liner has worn significantly enough to need replacement. Replacing liners too often introduces unnecessary cost and removes the elevator from service during the replacement procedure. An elevator that is out of service is not available for passengers and that is undesirable. On the other hand, waiting too long to replace a sheave liner increases a likelihood that the roping may experience undesired wear, which can lead to a more expensive replacement of the roping.

While different techniques for indicating sheave or sheave liner wear have been developed, those have not proven to be sufficiently economical or reliable to satisfy the need in the industry.

SUMMARY

An illustrative example embodiment of an elevator sheave liner includes a liner body having a first surface configured to engage an elevator load bearing member and a second surface. The liner body includes a plurality of blind holes in the second surface including at least a first blind hole and a second blind hole. A material of the liner body has a first thickness between the first blind hole and the first surface and a second, different thickness between the second blind hole and the first surface.

In an example embodiment having one or more features of the elevator sheave liner of the previous paragraph, the plurality of blind holes includes a third blind hole and the material of the liner body has a third thickness between the third blind hole and the first surface.

In an example embodiment having one or more features of the elevator sheave liner of any of the previous paragraphs, at least one of the plurality of blind holes has a width that is different than a width of at least one other of the blind holes.

In an example embodiment having one or more features of the elevator sheave liner of any of the previous paragraphs, the first blind hole has a first depth and the second blind hole has a second, different depth; the first depth provides an indication of a first amount of wear of the material; and the second depth provides an indication of a second, different amount of wear of the material.

In an example embodiment having one or more features of the elevator sheave liner of any of the previous paragraphs, the first blind hole becomes a visible through hole between the first surface and the second surface when an amount of the material of the liner body corresponding to the first thickness wears away and the second blind hole becomes a visible through hole between the first surface and the second surface when an amount of the material of the liner body corresponding to the second thickness wears away.

In an example embodiment having one or more features of the elevator sheave liner of any of the previous paragraphs, the first depth is deeper than the second depth, the first depth corresponds to a first remaining thickness of the material, the second depth corresponds to a second remaining thickness of the material and the second remaining thickness of the material corresponds to a minimum acceptable remaining thickness of the material.

In an example embodiment having one or more features of the elevator sheave liner of any of the previous paragraphs, the liner body comprises at least one of a polymer, plastic, polyurethane, metal, and a ceramic.

In an example embodiment having one or more features of the elevator sheave liner of any of the previous paragraphs, the blind holes are arranged in a line with a deepest one of the blind holes at one end of the line and a shallowest one of the blind holes at an opposite end of the line.

In an example embodiment having one or more features of the elevator sheave liner of any of the previous paragraphs, the first blind hole has a first depth and a first width, the second blind hole has a second depth and a second width, the first depth is deeper than the second depth and the second width is wider than the first width.

An illustrative example method of making an elevator sheave liner includes forming a liner body having a first surface configured to engage an elevator load bearing member and a second surface and establishing a plurality of blind holes in the second surface including at least a first blind hole and a second blind hole. The material of the liner body has a first thickness between the first blind hole and the first surface and a second, different thickness between the second blind hole and the first surface.

In an example embodiment having one or more features of the method of the previous paragraph, forming the liner body and establishing the plurality of blind holes are performed simultaneously.

In an example embodiment having one or more features of the method of any of the previous paragraphs, forming the liner body includes molding the liner body and establishing the plurality of blind holes comprises forming the blind holes when molding the liner body.

An example embodiment having one or more features of the method of any of the previous paragraphs includes establishing the plurality of blind holes subsequent to forming the liner body.

In an example embodiment having one or more features of the method of any of the previous paragraphs, establishing the plurality of blind holes includes providing the first blind hole with a first depth and a first width and providing the second blind hole with a second, different depth and a second, different width. The first depth is deeper than the second depth and the second width is wider than the first width.

An illustrative example method of determining a condition of an elevator sheave liner that includes a first surface configured to engage an elevator load bearing member, a second surface, an initial condition including no holes in the first surface and a plurality of blind holes in the second surface, includes observing the first surface of the elevator sheave liner and determining an amount of wear that the sheave liner has experienced based on a number of holes visible in the first surface. The amount of wear is one of an acceptable amount of wear or no wear when no holes are visible in the first surface. The amount of wear is acceptable when a first number of holes is visible in the first surface. The amount of wear is unacceptable when a second, greater number of holes is visible in the first surface.

In an example embodiment having one or more features of the method of any of the previous paragraphs, the first number of holes includes at least one hole.

An example embodiment having one or more features of the method of any of the previous paragraphs includes determining that the elevator sheave liner requires replacement when the amount of wear is unacceptable.

In an example embodiment having one or more features of the method of any of the previous paragraphs, observing the first surface of the elevator sheave liner comprises looking at the first surface.

In an example embodiment having one of more features of the method of any of the previous paragraphs, there are a plurality of sheave liners that each include a plurality of blind holes and the method comprises comparing a number of holes visible in the first surface of one of the sheave liners to a number of holes visible in the first surface of at least one other one of the sheave liners to determine if the one of the sheave liners has worn a different amount than the other one of the sheave liners.

The various features and advantages of at least one disclosed example embodiment will become apparent to those skilled in the art from the following detailed description. The drawings that accompany the detailed description can be briefly described as follows.

BRIEF DESCRIPTION OF THE DRAWINGS

FIG. 2 is a perspective illustration of a portion of an example sheave liner designed according to an embodiment of this invention.

FIG. 3 shows the portion of a sheave liner from FIG. 2 from another perspective.

FIG. 4 is a cross-sectional illustration taken along the lines 4-4 in FIG. 3.

FIG. 5 illustrates an example embodiment of a sheave liner in a first wear condition.

FIG. 6 illustrates the embodiment of FIG. 5 in a second wear condition.

DETAILED DESCRIPTION

Embodiments of this invention provide a visible indication of an amount of wear of a sheave liner. With an embodiment of this invention, determining an amount of wear of a sheave liner becomes a straightforward task that can be completed in an efficient manner.

Figure 1:
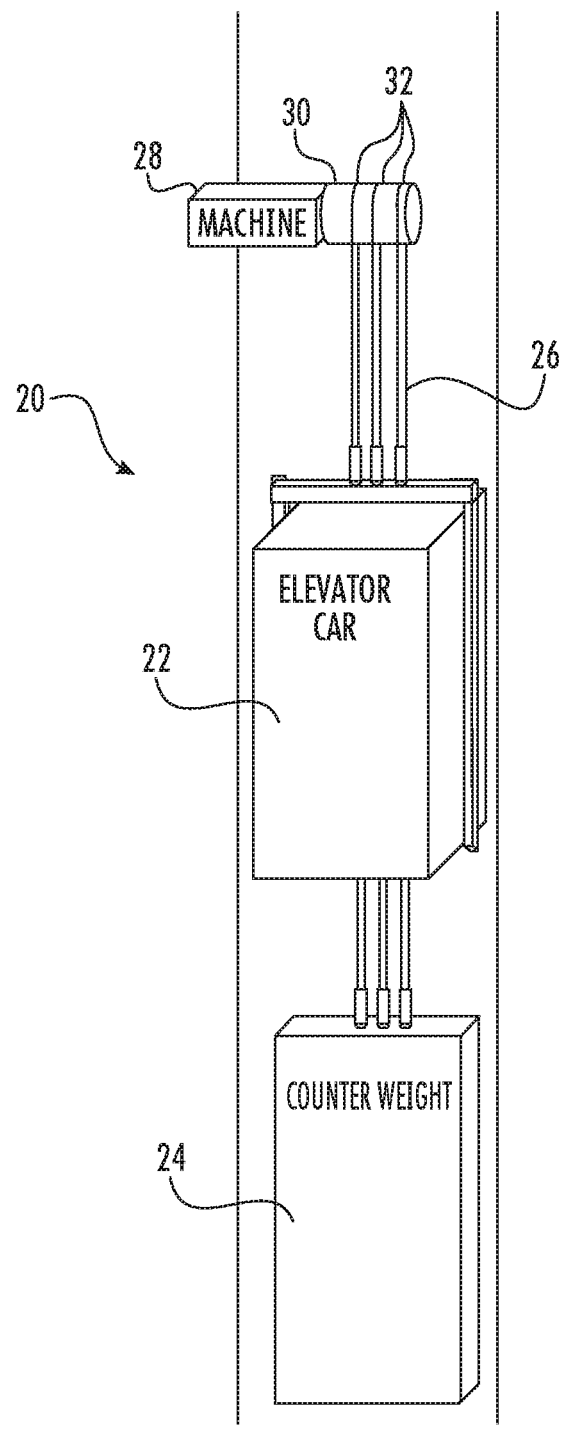
FIG. 1 schematically illustrates selected portions of an elevator system including sheave liners designed according to an embodiment of this invention.

FIG. 1 schematically illustrates selected portions of an elevator system 20. An elevator car 22 and counterweight 24 are supported by load bearing members 26. For discussion purposes, the load bearing members 26 in this example embodiment are a plurality of round steel ropes. A machine 28 operates in a known manner to selectively cause movement of a traction sheave 30 and the load bearing members 26 to control the movement and position of the elevator car 22.

The traction sheave 30 includes a plurality of sheave liners 32 that provide a surface against which the load bearing members 26 are received. The sheave liners 32 in this example comprise a plastic material that is selected to provide a desired traction characteristic. Other embodiments include a polymer or polyurethane material. Some embodiments of sheave liners 32 comprise friction materials including a metal or a ceramic, such as the those used in brake pads or liners. Given this description, those skilled in the art will be able to select an appropriate material to meet the needs of their particular situation.

FIGS. 2-4 show a portion of a sheave liner 32 in an initial or baseline condition. A liner body 33 includes a first surface 34 that is configured to engage one of the load bearing members 26. In this example, the first surface 34 is concave and has a radius of curvature corresponding to the outside surface of a round steel rope load bearing member 26. The liner body 33 includes a second surface 36 that faces in a different direction from the first surface 34. In this example, the second surface 36 is received against the traction sheave 30 and defines the inside diameter surface of the sheave liner 32.

A plurality of blind holes 40, 42 and 44 through the second surface 36 extend into the liner body 33. The blind holes 40-44 provide a visible indication of an amount of wear of the sheave liner 32 over time.

Considering the blind hole 40 as a first blind hole, it has a first depth $D_1$ shown in FIG. 4. In the initial or manufactured condition, the material of the liner body 33 has a first thickness $T_1$ between the deepest end of the first blind hole 40 and the first surface 34. In this embodiment the deepest end of the first blind hole 40 is the portion of the blind hole 40 that is closest to the first surface 34.

Considering the blind hole 44 as a second blind hole, it has a second depth $D_2$. As can be appreciated from FIG. 4, the second depth $D_2$ is less than the first depth $D_1$ of the first blind hole. The material of the liner body 33 has a second thickness $T_2$ between the deepest portion of the second blind hole 44 and the first surface 34 of the sheave liner 32.

The illustrated example embodiment includes three different depths for the three different example blind holes 40, 42 and 44.

The blind holes 40-44 provide a visual indication of an amount of wear of the material of the liner body 33 over time because as the sheave liner 32 wears, the thickness of the material between the first surface 34 and the second surface 36 decreases. Eventually, a sufficient amount of the material will be worn away so that the first blind hole 40 becomes a visible through hole between the second surface 36 and the first surface 34. This condition is shown in FIG. 5. The single hole 40 visible in FIG. 5 provides a visual indication of the amount of wear that a sheave liner 32 has experienced since being installed in the elevator system 20. The amount of liner material remaining when the first hole 40 initially becomes visible in the first surface 34 corresponds to the first depth $D_1$. In some installations, the presence of a single visible hole indicates some acceptable amount of wear of the sheave liner 32 that does not require liner replacement. Maintenance personnel may recognize the presence of a single hole 40 in a sheave liner 32 as an indication that the sheave liner 32 has become worn but does not yet need to be replaced.

Over time, additional material is worn away from the sheave liner 32 and the first surface 34 becomes closer to the second surface 36. At some point, the blind hole 42 becomes a visible through hole between the first surface 34 and the second surface 36. This condition is shown in FIG. 6. Depending on the particular liner configuration, the presence of a second visible hole may indicate a need to replace the sheave liner immediately. In other installations, the presence of a second hole 42 as shown in FIG. 6 provides an indication to maintenance personnel that the sheave liner 32 is in a condition that is acceptable but will require replacement in the near future.

In the example embodiment, the blind hole 44 is set to a depth $D_2$ so that when a third visible hole is apparent at the first surface 34, that indicates a condition in which the sheave liner 32 should be replaced immediately. The remaining material thickness corresponding to the depth $D_2$ is considered small enough to warrant immediate replacement of the liner.

Including multiple blind holes not only provides a visible indicator of progressive liner wear over time but also facilitates comparing one groove or liner on a sheave to another. Traction sheaves often have multiple grooves and one of the example sheave liners 32 will be situated in each of the grooves. Some embodiments include more holes with relatively small depth increments to allow an inspector to determine if one liner or groove has worn more than another. For example, if the difference in hole depths is approximately 0.5 mm and one additional hole becomes visible in one sheave liner 32 compared to the groove in an adjacent sheave liner 32, then the inspector would know that the sheave liner 32 with more holes has worn at least 0.5 mm more than the other.

Another feature of the illustrated embodiment is that each of the blind holes has a width that is different than the width of the other blind holes. In this example, the first blind hole 40 has a first width that is not as wide as the width of the blind hole 42. The blind hole 44 has the largest width and shortest depth in this example.

Having different widths of the different blind holes provides a further visual indicator of the amount of wear. Given that the first blind hole 40 is the deepest of the example blind holes, it will become visually apparent as a through hole first. As the sheave liner continues to wear and more holes become visible as indicators of wear, increasing the width of the holes provides a further visual indication of the amount of wear because a wider hole corresponds to more wear. Maintenance personnel will recognize not only the number of visible holes but the increasing size of those holes as an indicator of an increasing likelihood that the sheave liner 32 should be replaced.

In the illustrated example embodiment, the blind holes 40-44 are arranged in a line and the deepest and thinnest blind hole 40 is situated at one end of the line while the most shallow and most wide blind hole 44 is at an opposite end of the line. This arrangement further enhances the visual indication of progressive wear of the sheave liner material.

Given this description, those skilled in the art will be able to select appropriate blind hole depth and to use their knowledge regarding the sheave liner material to correlate a number of visible holes with a level of wear corresponding to the timing for replacing that particular sheave liner.

Figure 7:
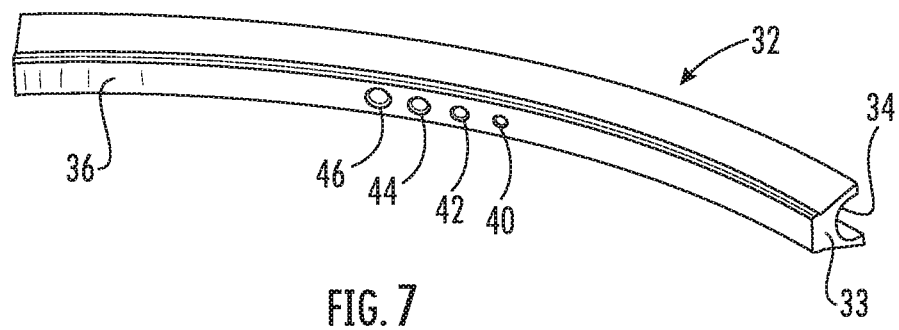
FIG. 7 illustrates another example embodiment of a sheave liner.
Figure 8:
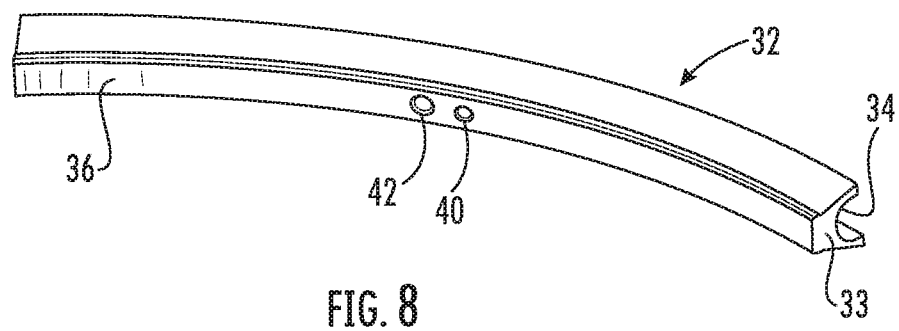
FIG. 8 illustrates another example embodiment of a sheave liner.

While three blind holes are illustrated for discussion purposes, some embodiments include more or less than three holes. FIG. 7 shows an embodiment that includes four holes 40-46. FIG. 8 shows an embodiment including two holes 40 and 42. Further, some embodiments include a series of blind holes spaced about the circumference of the sheave liner 32 to increase the likelihood that maintenance personnel will be able to observe whether visible holes are present regardless of the particular orientation of the sheave 30 or sheave liner 32 during an inspection procedure. For example, three through holes may be situated together at each of four different locations spaced approximately 90° apart from each other around the inner circumference of the sheave liner 32. Given that the sheave liner 32 will wear consistently around its periphery, the number of holes visible at any one of those locations will be the same. Spacing blind holes about the second surface 36 in this manner further enhances the economies associated with determining a condition of the elevator sheave liner 32.

Figure 9:
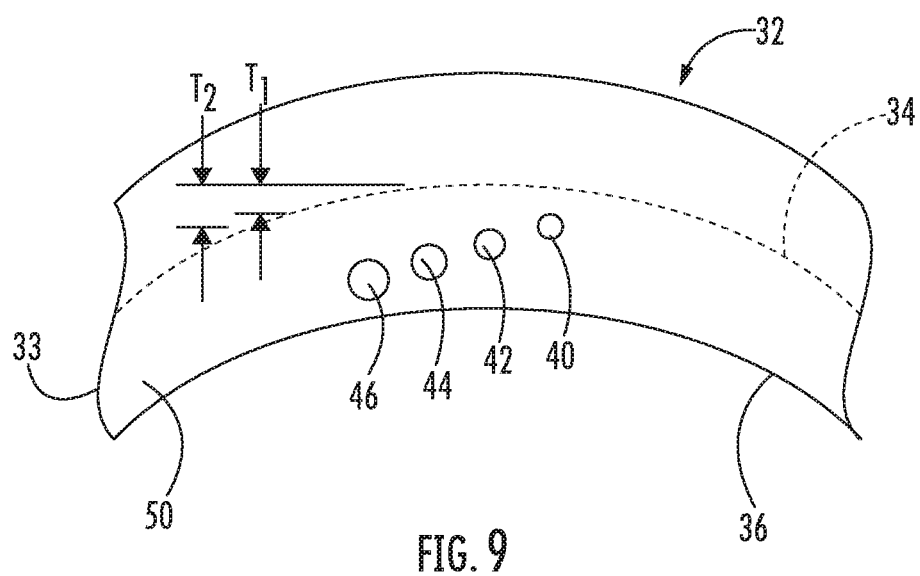
FIG. 9 illustrates another example embodiment of a sheave liner.

Another embodiment is shown in FIG. 9 where holes 40-46' are provided in a second surface 50 on a side of the sheave liner 32. In this example the blind hole 40 is situated closer to the first surface 34 compared to the other holes 42-46. The position of the first hole 40 leaves a first thickness $T_1$ of the material of the sheave liner body 33 between the first hole 40 and the surface 34 that engages the load bearing member. The second hole 42 leaves a second thickness $T_2$ of the material of the liner body 33 between the second hole 42 and the surface 34. The holes 44 and 46 are progressively further from the surface 34. As the sheave liner 32 wears over time the holes 40-46 will sequentially become visible indicating progressive wear in a similar manner that the holes in the embodiments described above provide a visual indication of wear.

In some embodiments like that shown in FIG. 9, the holes are blind holes and in other embodiments the holes extend through the liner body 33 from one side surface 50 to an oppositely facing side surface.

An example method of making the sheave liner 32 includes forming the liner body 33 to have the first surface 34 and second surface 36. Establishing the plurality of blind holes 40-44 may be accomplished simultaneously with forming the liner body 33. In one example embodiment, the liner body 33 is formed in a molding process and the blind holes are formed in the mold. In another example, the sheave liner body 33 is formed and the blind holes are added subsequently.

Determining the condition of the sheave liner 32 includes observing the first surface 34 and determining an amount of wear that the sheave liner 32 has experienced based on a number of holes visible in the first surface 34. For example, if no holes are visible, the determined amount of wear is considered to be either no wear or an acceptable amount of wear. If a first number of holes is visible in the first surface, that may indicate that the amount of wear is acceptable. A second, greater number of holes visible in the first surface indicates that the amount of wear is unacceptable. In such an example, the first number of holes includes at least one hole.

Observing the presence of holes in the sheave liner 32 may be accomplished by an individual manually, visually inspecting the sheave liner 32. The presence of the holes may also be determined based on images obtained by a camera.

Sheave liners designed according to an embodiment of this invention provide a fast and efficient way to determine the level of liner wear without requiring special tools or measurement instruments. An individual determining the amount of wear need not directly contact the sheave liner or load bearing members of the roping arrangement. The condition of the liner may be inspected and determined at the same time that an individual is inspecting the load bearing members, for example.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. An elevator sheave liner comprising
a liner body having a first surface configured to engage an elevator load bearing member and a second surface facing in a different direction than the first surface, the liner body including a plurality of blind holes in the second surface including at least a first blind hole and a second blind hole, a material of the liner body having a first thickness between the first blind hole and the first surface, the material having a second, different thickness between the second blind hole and the first surface.

2. The elevator sheave liner of claim 1, wherein the plurality of blind holes includes a third blind hole, the material of the liner body having a third thickness between the third blind hole and the first surface, the third thickness being different than each of the first thickness and the second thickness.

3. The elevator sheave liner of claim 2, wherein at least one of the plurality of blind holes has a width that is different than a width of at least one other of the blind holes.

4. The elevator sheave of claim 1, wherein
the first blind hole has a first depth;
the second blind hole has a second depth that is different than the first depth;
the first depth provides an indication of a first amount of wear of the material; and
the second depth provides an indication of a second, different amount of wear of the material.

5. The elevator sheave liner of claim 4, wherein
the first blind hole becomes a visible through hole between the first surface and the second surface when an amount of the material of the liner body corresponding to the first thickness wears away; and
the second blind hole becomes a visible through hole between the first surface and the second surface when an amount of the material of the liner body corresponding to the second thickness wears away.

6. The elevator sheave liner of claim 4, wherein
the first depth is deeper than the second depth;
the first depth corresponds to a first remaining thickness of the material;
the second depth corresponds to a second remaining thickness of the material; and
the second remaining thickness of the material corresponds to a minimum acceptable remaining thickness of the material.

7. The elevator sheave liner of claim 1, wherein the liner body comprises one or more of plastic, a polymer, polyurethane, a metal, and a ceramic.

8. The elevator sheave liner of claim 1, wherein the blind holes are arranged in a line with a deepest one of the blind holes at one end of the line and a shallowest one of the blind holes at an opposite end of the line.

9. The elevator sheave liner of claim 1, wherein
the first blind hole has a first width and a first depth;
the second blind hole has a second width and a second depth;
the first depth is deeper than the second depth; and
the second width is wider than the first width.

10. A method of making an elevator sheave liner, the method comprising:

forming a liner body having a first surface configured to engage an elevator load bearing member and a second surface facing in a different direction than the first surface; and
establishing a plurality of blind holes in the second surface including at least a first blind hole and a second blind hole, the first blind hole leaving a first thickness of a material of the liner body between the first blind hole and the first surface, the second blind hole leaving a second thickness of the material between the second blind hole and the first surface.

11. The method of claim 10, wherein forming the liner body and establishing the plurality of blind holes are performed simultaneously.

12. The method of claim 11, wherein
forming the liner body includes molding the liner body; and
establishing the plurality of blind holes comprises forming the blind holes when molding the liner body.

13. The method of claim 10, comprising establishing the plurality of blind holes subsequent to forming the liner body.

14. The method of claim 10, wherein
establishing the plurality of blind holes includes providing the first blind hole with a first depth and a first width and providing the second blind hole with a second, different depth and a second, different width;
the first depth is deeper than the second depth; and
the second width is wider than the first width.

15. A method of determining a condition of an elevator sheave liner that includes a first surface configured to engage an elevator load bearing member, a second surface facing a different direction than the first surface, the elevator sheave liner having an initial condition including no holes in the first surface and a plurality of blind holes in the second surface, the method comprising:
observing the first surface of the elevator sheave liner; and
determining an amount of wear that the sheave liner has experienced based on a number of holes visible in the first surface including
determining that the amount of wear is one of an acceptable amount of wear or no wear when no holes are visible in the first surface,
determining that the amount of wear is acceptable when a first number of holes is visible in the first surface, and
determining that the amount of wear is unacceptable when a second, greater number of holes is visible in the first surface.

16. The method of claim 15, wherein the first number of holes includes at least one hole.

17. The method of claim 15, comprising determining that the elevator sheave liner requires replacement when the amount of wear is unacceptable.

18. The method of claim 15, wherein observing the first surface of the elevator sheave liner comprises looking at the first surface.

19. The method of claim 15, wherein
there are a plurality of sheave liners that each include a plurality of blind holes; and
the method comprises comparing a number of holes visible in the first surface of one of the sheave liners to a number of holes visible in the first surface of at least one other one of the sheave liners to determine if the one of the sheave liners has worn a different amount than the other one of the sheave liners.

* * * * *